(12) United States Patent
Boos et al.

(10) Patent No.: US 12,414,553 B2
(45) Date of Patent: Sep. 16, 2025

(54) FISHING LURE

(71) Applicants: Jonathan Bradley Boos, Sarasota, FL (US); Joseph Marion Swails, Summerville, SC (US)

(72) Inventors: Jonathan Bradley Boos, Sarasota, FL (US); Joseph Marion Swails, Summerville, SC (US)

( * ) Notice: Subject to any disclaimer, the term of this patent is extended or adjusted under 35 U.S.C. 154(b) by 265 days.

(21) Appl. No.: 18/234,542

(22) Filed: Aug. 16, 2023

(65) Prior Publication Data

US 2025/0057134 A1    Feb. 20, 2025

(51) Int. Cl.
*A01K 85/00* (2006.01)

(52) U.S. Cl.
CPC ...... *A01K 85/1863* (2022.02); *A01K 85/1847* (2022.02)

(58) Field of Classification Search
CPC .............. A01K 85/1863; A01K 85/1847
See application file for complete search history.

(56) References Cited

U.S. PATENT DOCUMENTS

| | | | | |
|---|---|---|---|---|
| 1,154,168 A | * | 9/1915 | Bosserman | A01K 85/02 43/42.36 |
| 2,429,568 A | * | 10/1947 | Stevermer | A01K 85/10 43/42.34 |
| 2,523,536 A | * | 9/1950 | Maddux | A01K 85/18 43/42.06 |
| 2,804,713 A | | 9/1957 | Johnson | |
| 2,885,818 A | * | 5/1959 | Frederiksen, Sr. | A01K 85/12 D22/129 |
| 2,926,451 A | * | 3/1960 | Leba | A01K 85/12 43/42.17 |
| 4,135,323 A | * | 1/1979 | Esten | A01K 85/01 43/42.31 |
| 4,139,964 A | * | 2/1979 | Pelletier | A01K 91/06 43/42.19 |
| 4,616,440 A | | 10/1986 | Millroy | |
| 4,630,389 A | | 12/1986 | Higgins | |
| D300,448 S | * | 3/1989 | Oden | D22/126 |
| 5,321,905 A | | 6/1994 | Higgins | |
| 6,523,297 B1 | | 2/2003 | Hair, III et al. | |
| 7,036,264 B2 | | 5/2006 | Barbary | |
| 10,881,088 B2 | | 1/2021 | Ruboyianes et al. | |

(Continued)

*Primary Examiner* — Peter M Poon
*Assistant Examiner* — Marisa V Conlon
(74) *Attorney, Agent, or Firm* — Westman, Champlin & Koehler, P.A.; Amanda M. Prose; Daniel J. Polglaze

(57) ABSTRACT

A fishing lure includes a main body having an interior conical body portion having a flat surface at a first end, and an opening with a circumferential lip surrounding and extending from the opening at a second opposite end; and an exterior conical body portion surrounding the interior conical shape and extending from the flat surface to the circumferential lip. The exterior conical body portion is spaced apart from the interior conical body portion, defining a gap between an exterior of the interior conical body portion and an interior of the exterior conical body portion. The exterior body portion has a plurality of openings therein to the gap. A ring surrounds an exterior of the exterior conical body portion. The ring has a flat portion and a lip, and is positioned between the first end and the second end. The lip extends from an exterior circumference of the flat portion toward the first end.

8 Claims, 6 Drawing Sheets

(56) References Cited

U.S. PATENT DOCUMENTS

| | | | | |
|---|---|---|---|---|
| 2004/0025405 | A1* | 2/2004 | Rivera Gomez | A01K 85/00 43/42.12 |
| 2023/0148577 | A1* | 5/2023 | Nelson | A01K 85/1847 43/17.6 |

* cited by examiner

FISHING LURE

SUMMARY

A fishing lure includes a main body having an interior conical body portion having a flat surface at a first end, and an opening with a circumferential lip surrounding and extending from the opening at a second opposite end; and an exterior conical body portion surrounding the interior conical shape and extending from the flat surface to the circumferential lip. The exterior conical body portion is spaced apart from the interior conical body portion, defining a gap between an exterior of the interior conical body portion and an interior of the exterior conical body portion. The exterior body portion has a plurality of openings therein to the gap. A ring surrounds an exterior of the exterior conical body portion. The ring has a flat portion and a lip, and is positioned between the first end and the second end. The lip extends from an exterior circumference of the flat portion toward the first end.

This summary is not intended to describe each disclosed embodiment or every implementation of trigger relocation assemblies as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
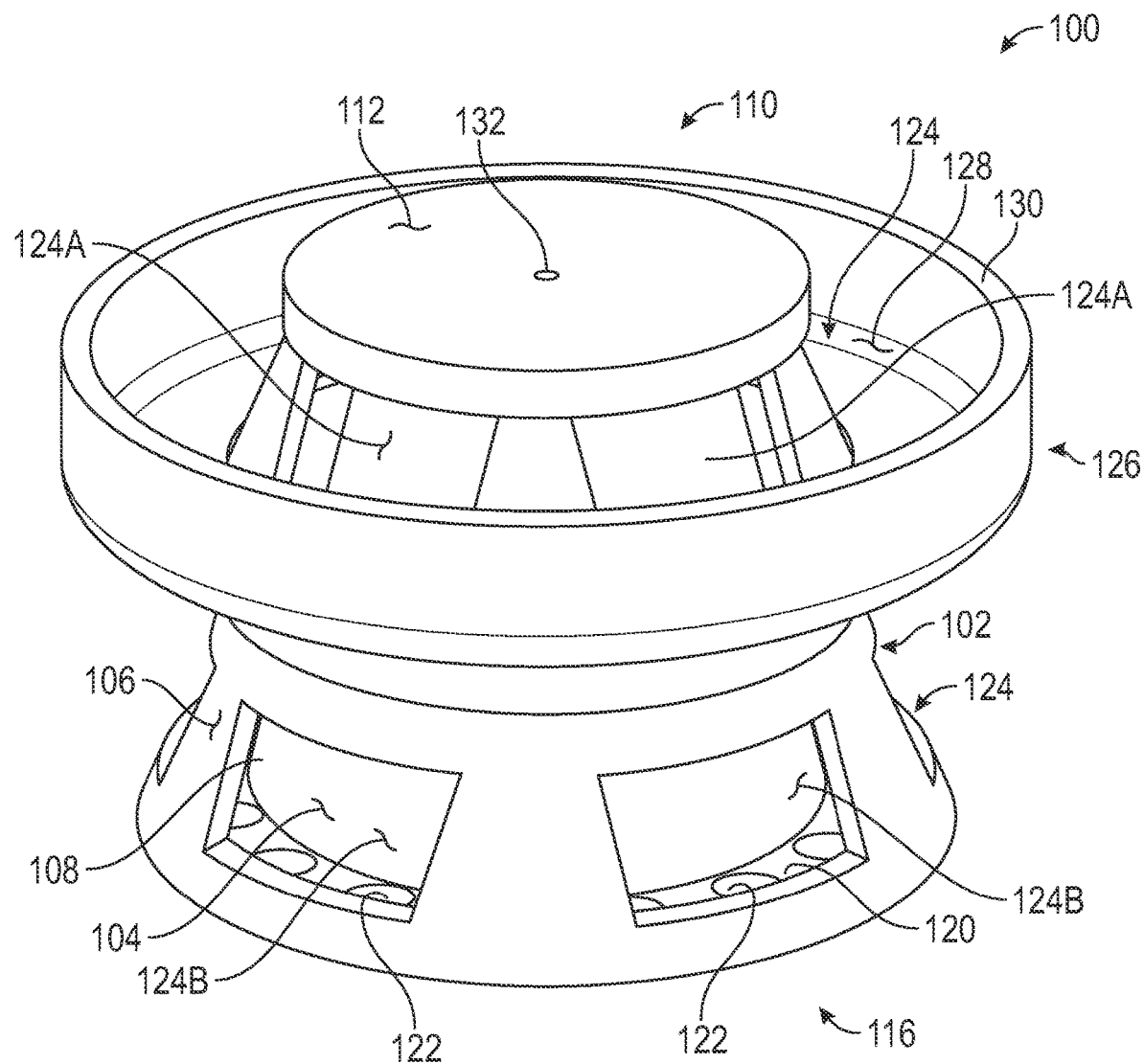
FIG. 1 is a perspective view of a fishing lure according to an embodiment of the present disclosure.

In general, embodiments of the present disclosure provide a fishing lure that moves in a random manner when moving through water, and which protects a bait fish from disengaging the lure during that movement through the water. Embodiments of the present disclosure include a conical main body with interior and exterior conical portions defining a gape therebetween, with the outer conical portion having openings through which water and/or air flows when the fishing lure is being moved through water or at a water surface, causing the fishing lure to move in a random fashion. Embodiments also include a ring that scoops water and/or air into a first set of the openings on one side of the ring and out a second set of openings on an other side of the ring. The inner conical portion provides protection for the attachment of a bait spring or the like and provides increased ability to maintain the bait and bait spring with the fishing lure during fishing.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a perspective view of a fishing lure 100 according to an embodiment of the present disclosure. Lure 100 comprises in one embodiment a main body 102 having an inner conical body portion 104 and an outer conical body portion 106. The inner conical body portion 104 and the outer conical body portion 106 define a gap 108 therebetween. The gap 108 is between an exterior surface of the inner conical body portion 104 and an interior surface of the outer conical body portion 106. At a first end 110 of the lure 100, a flat surface 112 connects the inner conical body portion 104 and the outer conical body portion 106. In one embodiment, the flat surface 112 is a disc shaped surface. The flat surface 112 forms a leading surface for the fishing lure 100 when the lure 100 is moving through water or at a water surface. In one embodiment, the flat surface 112 forms, with an interior surface of the interior conical body portion, a truncated inner conical cavity 114 (see FIGS. 3-4) of the fishing lure 100, into which a bait fish and rig (described further below) may be positioned for fishing.

The interior conical body portion 104 has a second end 116 opposite the first end 110. The interior conical body portion 104 cavity 114 has an opening 118 at second end 116. A lip 120 extends from the interior conical body portion 104 at end 116 to the exterior conical body portion 106. Lip 120 has in one embodiment a plurality of openings 122 therein. Exterior conical body portion 106 has a plurality of openings 124 therein, opening the exterior conical body portion 106 to the gap 108. In one embodiment, the exterior conical body portion 106 includes openings 124 at spaced intervals about the exterior thereof.

In one embodiment, the flat surface 112 extends radially beyond an exterior of the exterior conical body portion 106. In one embodiment, the flat surface 112 forms a leading end of the fishing lure as well as a top of the cavity 114.

A ring 126 surrounds an exterior of the exterior conical body portion 106 in one embodiment. Ring 126 includes a flat portion 128 that extends from the exterior conical body portion 106 to a lip 130 that extends toward the first end 110. In one embodiment, the flat portion is substantially parallel to the flat surface 112, and the lip 130 is substantially perpendicular to the flat portion 128. In this configuration, the ring comprises a cup shape.

The ring 126 is positioned in one embodiment partway between the first end 110 and the second end 116. A first set 124A of the plurality of openings 124 of the exterior conical body portion 106 is between the first end 110 and the ring 126. A second set 124B of the plurality of openings 124 is between the ring 126 and the second end 116. The ring 126 with its flat portion 128 and lip 130 form in this configuration a cup shape that directs water and/or air into the gap 108 through the first set of the plurality of openings 124 when the lure 100 is dragged through water or at a water surface. When water and/or air enters the gap 108, it may exit through any combination of the first set of openings 124 The water and/or air then exits the gap 108 through one or a combination of the second set of openings 124 and the openings 122. The flow of air and/or water through the gap via the first set of the plurality of openings 124 to the second set of the plurality of openings 124 and/or the openings 122 creates a random motion of the lure 100. Such random motion may include chugging, smooth motion, jerky motion, or the like, including the lure 100 diving, skirting along or near a surface of the water, or a combination thereof.

The cup shape of the lip 126 in combination with the flat surface 112 and the exterior conical body portion 106 creates a turbulent flow of water and/or air when the lure 100 is moving through water and/or at a water surface. This turbulent flow includes water splashing back toward the first end, assisting in the creation of a chugging motion.

In one embodiment, the lure 100 is attached to a fishing line/leader via a through opening 132 that extends through the flat surface 112 from the first end 110 into the cavity 118. A leader or other line may be run through the opening 132 and then a rig such as that discussed below may be used to place a bait fish on the lure 100.

Figure 2:
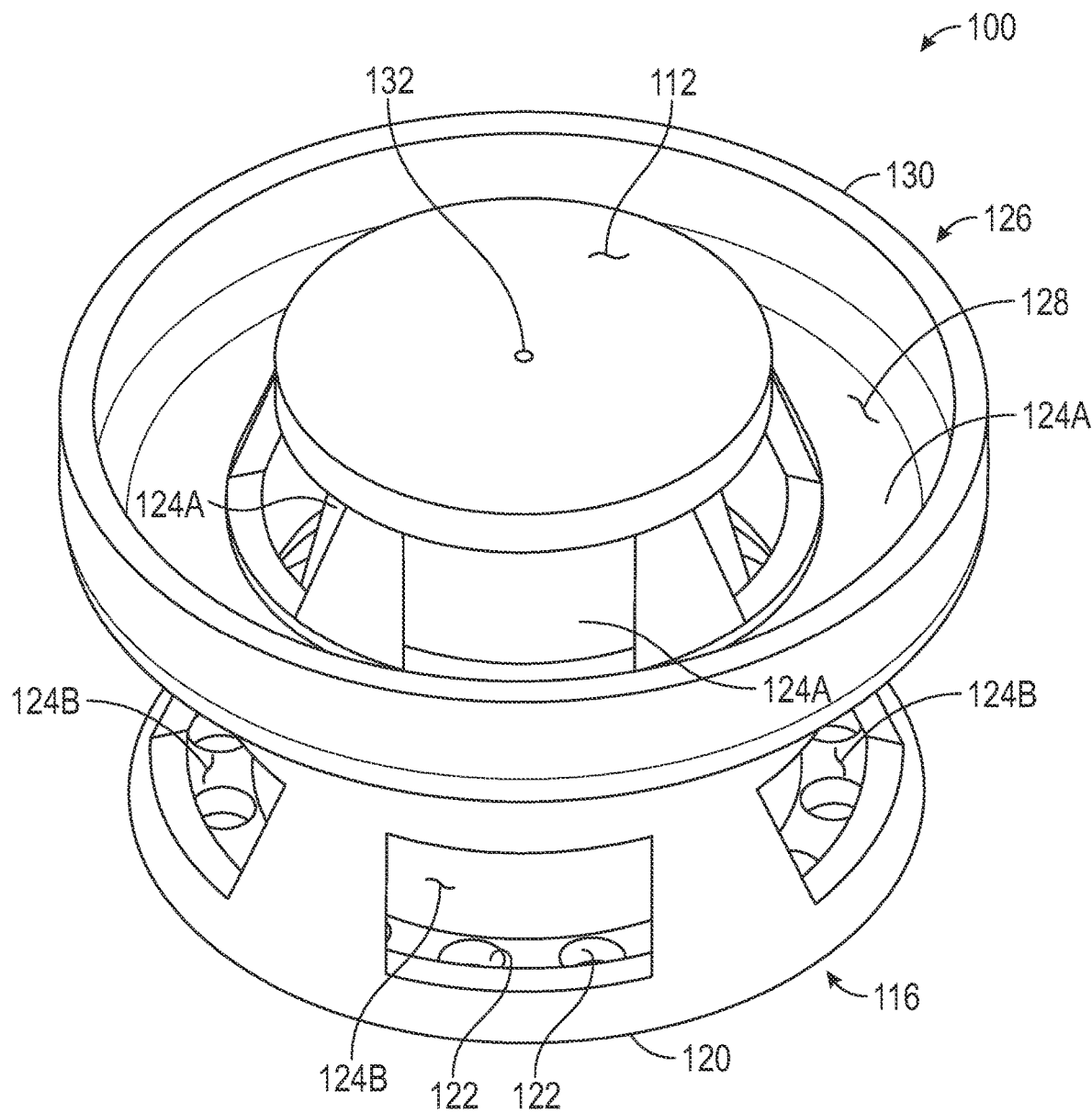
FIG. 2 is a top perspective view of the fishing lure of FIG. 1.
Figure 3:
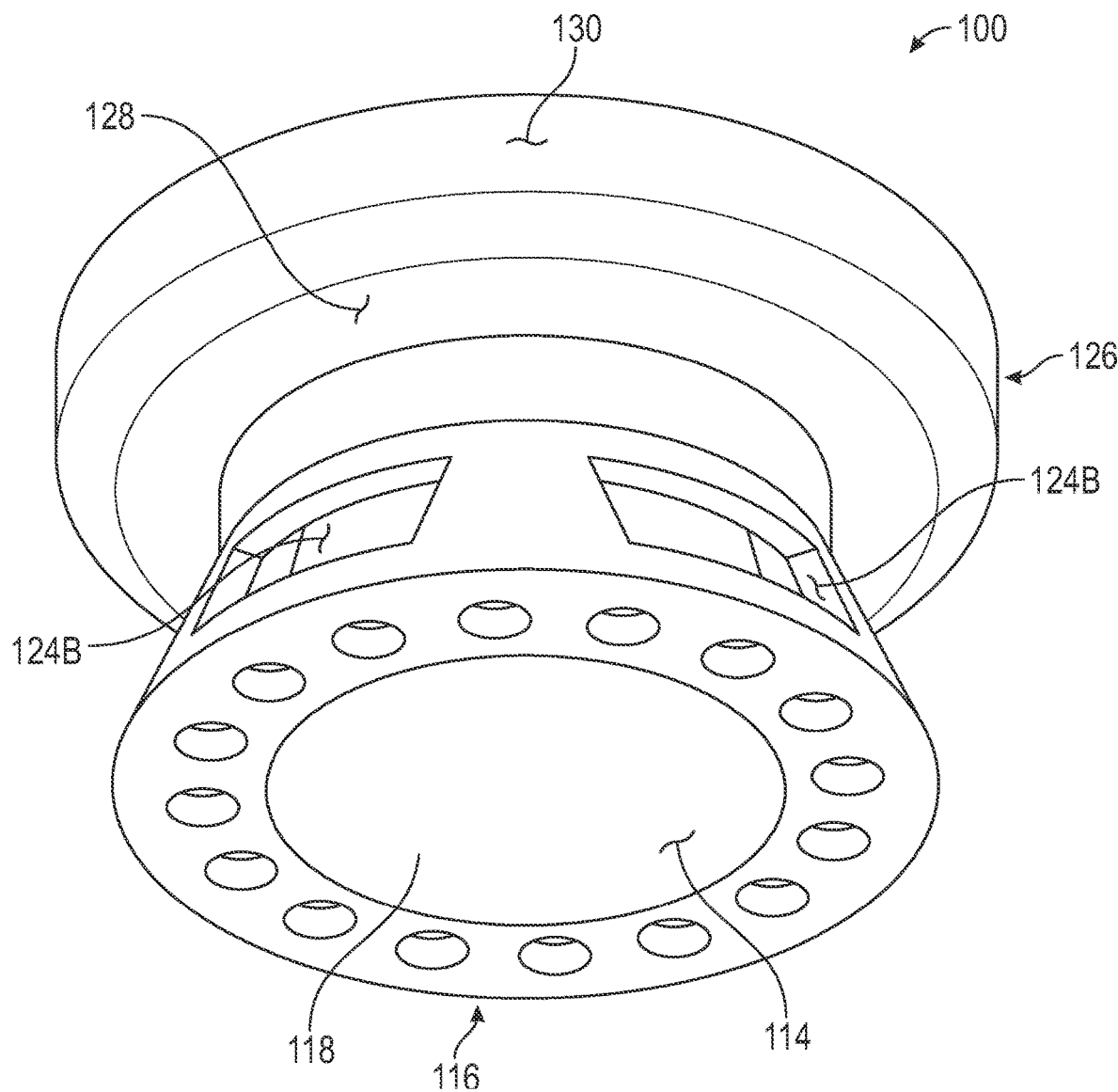
FIG. 3 is a bottom perspective view of the fishing lure of FIG. 1.
Figure 4:
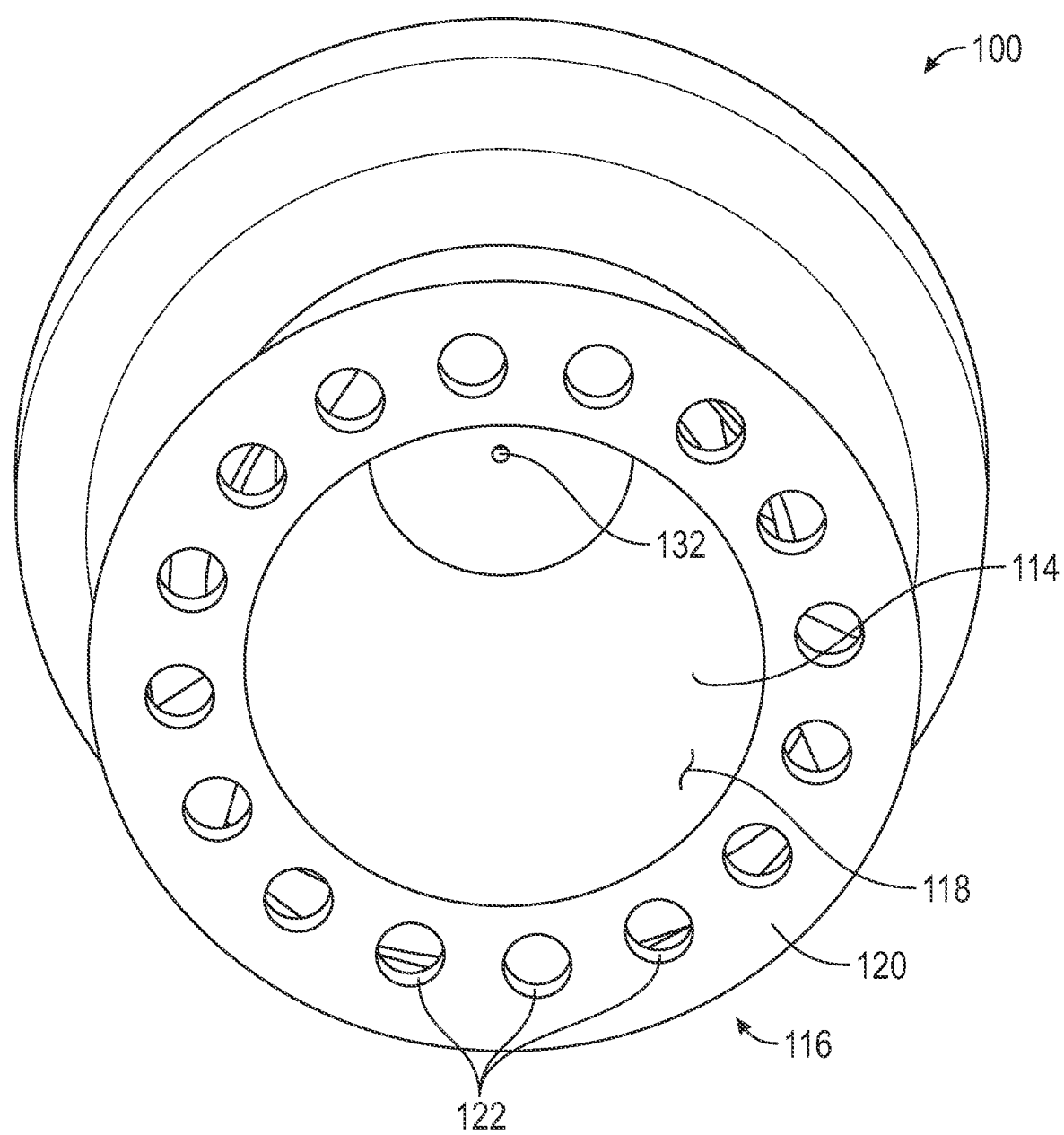
FIG. 4 is another bottom perspective view of the fishing lure of FIG. 1.

FIGS. 2, 3, and 4 show the fishing lure 100 from different angles. FIG. 2 is a perspective view from a top angle. FIG. 3 is a perspective view from a bottom angle. FIG. 4 is a perspective view from a different bottom angle.

Figure 5:
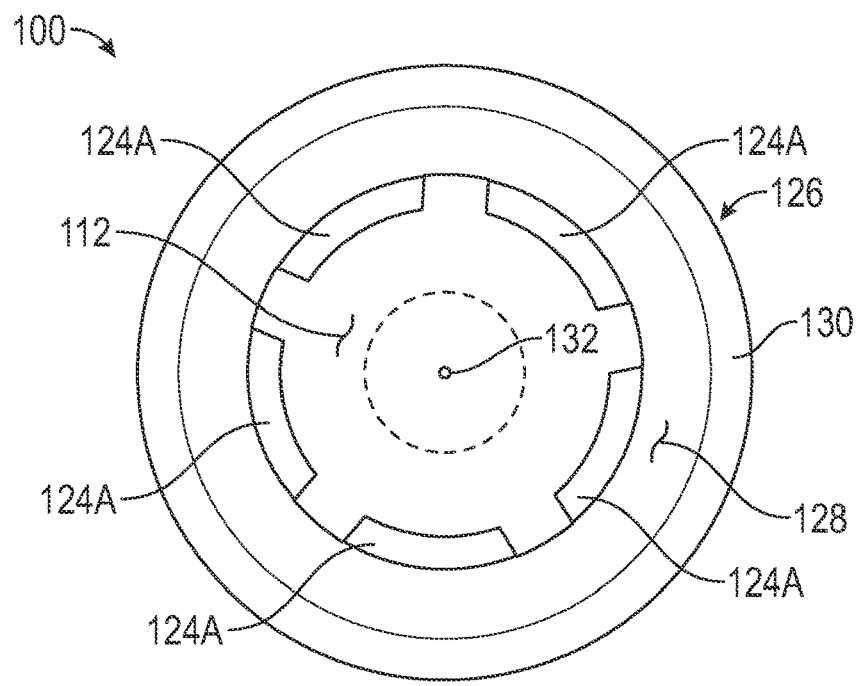
FIG. 5 is a top elevation view of the fishing lure of FIG. 1.
Figure 6:
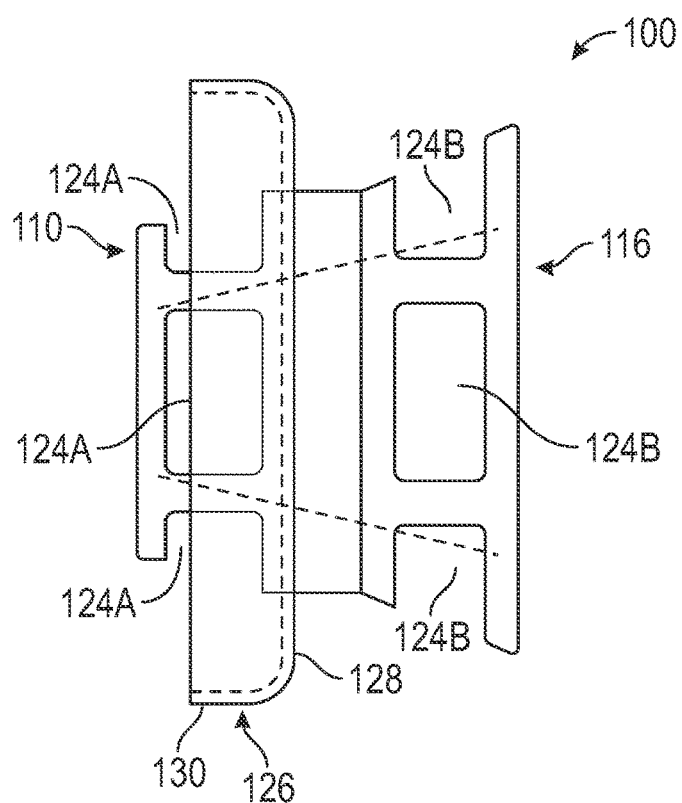
FIG. 6 is a side elevation view of the fishing lure of FIG. 1.
Figure 7:
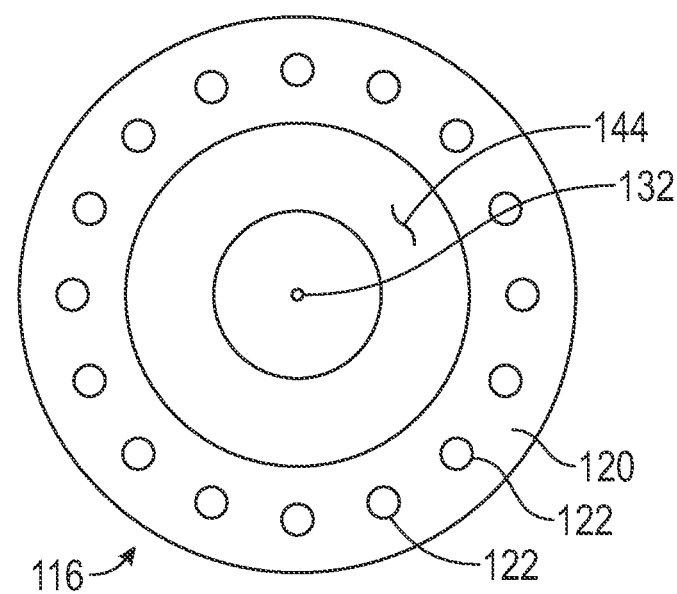
FIG. 7 is a bottom elevation view of the fishing lure of FIG. 1.
Figure 8:
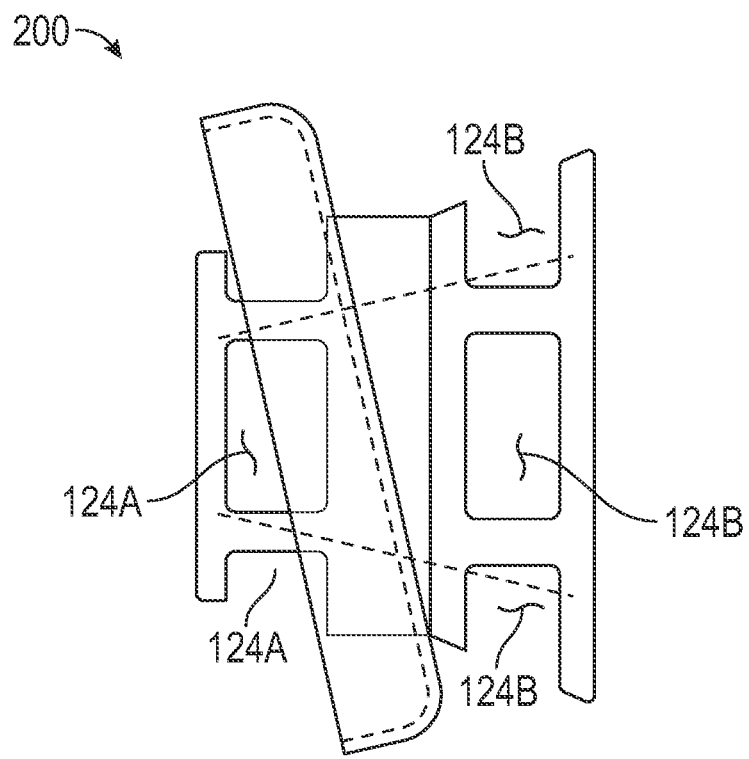
FIG. 8 is a side elevation view of a fishing lure according to another embodiment of the present disclosure.

FIG. 5 shows the fishing lure 100 in top elevation view. FIG. 6 shows the fishing lure 100 in a side elevation view. FIG. 7 shows the fishing lure 100 in a bottom elevation view.

The truncated interior conical cavity 118 provides a protected area for connection of a rig for fishing. Such a rig may include, for example only and not by way of limitation, The interior truncated cone cavity 118 of the present disclosure serves as a protective cover for a bait fish and rig used for fishing. In fishing for certain types of fish, the bait fish is a ballyhoo, connected with a rig. A rig for bait fish typically includes a leader, a bait spring, and a hook, plus the bait fish. In use, a bait fish is hooked, and a bait spring is placed at a top of the hook where the leader attaches to the bait spring and hook. Then, a skirt is placed around the ballyhoo to protect it from being disengaged from the rig. The skirts are problematic for several reasons (enumerate here?).

Embodiments of the present disclosure allow for the connection of a ballyhoo or other bait fish where the bait spring and connection is protected within the truncated cone interior cavity 118 of the lure 100. The cavity 118 sits over the bait spring. This configuration places the action of the lure 100 around the bait, instead of in front of the bait like the other lures. Further, the protective cone cavity 118 helps prevent live-bait wash out by protecting the most delicate part of the rig to bait fish connection.

As the lure 100 chugs and sprays because of its design, and intakes water and/or air and moves—dives, chugs, aerates, and generally moves in a random type of pattern, the cavity 118 protects the bait fish connection.

The chugging motion of the embodiments of the present disclosure as well as the conical interior body portion protect against washout, that is, losing the bait fish too early due to water movement about the rig and spring. The rig and spring in the present disclosure are protected against washout by the interior conical section cavity 118. The lure 100 creates a chugging moving motion without causing undue stress on the connection of the bait fish to the rig and ultimately to the fishing pole. Embodiments of the present disclosure provide for naked ballyhoo (or other bait fish) fishing while protecting the ballyhoo (or other bait fish) from easily washing out from the rig.

Depending on the type of bait fish, different size lures may be used. Such different sized lures have the same design, but are sized appropriately for the bait fish. Similarly, different springs, rigs, and hooks may be used, all while employing embodiments of the present disclosure, without departing therefrom.

In one embodiment, the fishing lure 100 is comprised of a single injection molded piece. It should be understood that the fishing lure 100 may also be made from individual pieces or components without departing from the scope of the disclosure.

Embodiments of the present disclosure provide method and apparatus of collecting, diverting and passing water as well as air through a device to attract fish in various ways. The embodiments of the present disclosure are used in addition to live/dead bait and/or in conjunction with a fake fish lure. The embodiments of the present disclosure create water and air movement of the lure and bait fish in numerous ways, which can create chugging, bubbles, and/or spray, as well as water movement, to attract fish through hydrodynamics. A silicone or filament skirt can be added for additional fish attraction due to hydrodynamics flowing underneath as well as around the skirt as water/air flows through the apparatus. The embodiments also prevent washing out bait prematurely by redirecting water flow around the bait fish, which is protected in the interior cavity 118.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A fishing lure, comprising:
   a main body comprising:
   an interior conical body portion having a flat surface at a first end, and an opening with a circumferential lip surrounding and extending from the opening at a second opposite end; and
   an exterior conical body portion surrounding the interior conical shape and extending from the flat surface to the circumferential lip, the exterior conical body portion spaced apart from the interior conical body portion, defining a gap between an exterior of the interior conical body portion and an interior of the exterior conical body portion, the exterior body portion having a plurality of openings therein to the gap, wherein the plurality of openings comprises openings between the ring and the first end and openings between the ring and the second end, and a ring surrounding an exterior of the exterior conical body portion, the ring having a flat portion and a lip, the ring positioned between the first end and the second end, the lip extending from an exterior circumference of the flat portion toward the first end;

wherein the ring is configured to gather air and water and direct the air and water to the openings between the ring and the first end, and wherein the air and water is directed to one or more of: the openings between the ring and the first end, the openings between the ring and the second end, and a plurality of openings in the circumferential lip.

2. The fishing lure of claim 1, wherein the circumferential lip comprises a plurality of openings.

3. The fishing lure of claim 1, wherein the interior conical body has an attachment point for attaching a bait spring thereto.

4. The fishing lure of claim 3, wherein the attachment point is a through opening in the flat surface.

5. The fishing lure of claim 1, wherein the ring is substantially parallel to the flat surface.

6. The fishing lure of claim 1, wherein the ring is angled with respect to the flat surface at an angle of about 15 degrees.

7. The fishing lure of claim 1, wherein the flat surface has an opening at a center thereof, extending into an interior of the inner conical body portion.

8. The fishing lure of claim 1, wherein the flat surface extends past the exterior conical body portion at the first end.

* * * * *